(No Model.)
J. W. GRANTLAND.
EXPANDING MANDREL.
No. 465,075. Patented Dec. 15, 1891.
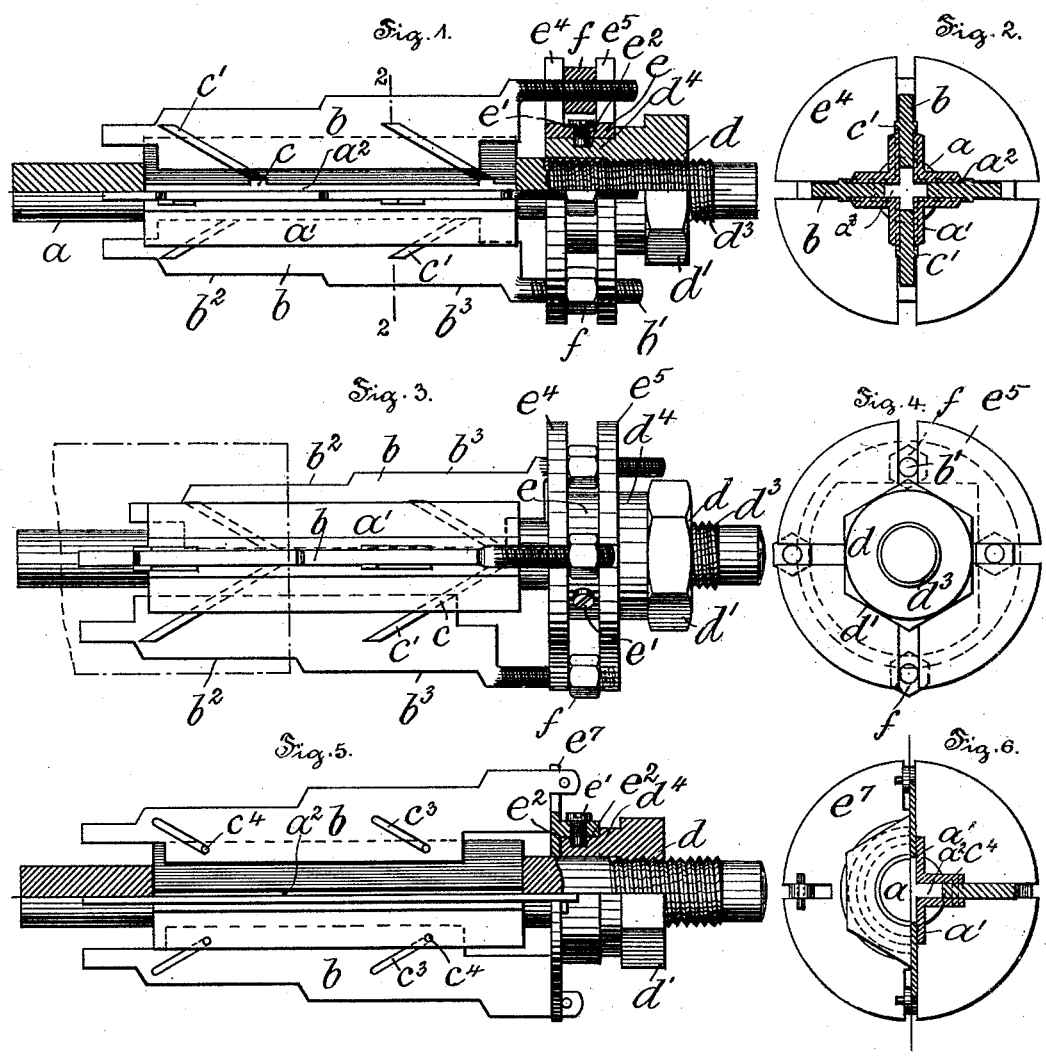
Witnesses:
Hermann Bormann
Thomas M. Smith
Inventor:
John W. Grantland
by J. Walter Douglass
Att'y

UNITED STATES PATENT OFFICE.

JOHN WALTER GRANTLAND, OF PHILADELPHIA, PENNSYLVANIA, ASSIGNOR OF THREE-FOURTHS TO ARTHUR J. INGRAHAM AND WILLIAM L. BOGGS, OF SAME PLACE.

EXPANDING MANDREL.

SPECIFICATION forming part of Letters Patent No. 465,075, dated December 15, 1891.

Application filed July 28, 1891. Serial No. 400,968. (No model.)

*To all whom it may concern:*

Be it known that I, JOHN WALTER GRANTLAND, a citizen of the United States, residing at the city of Philadelphia, in the county of Philadelphia and State of Pennsylvania, have invented certain new and useful Improvements in Expanding Mandrels, of which the following is a specification.

The principal object of my present invention is to provide a simple, durable, and comparatively inexpensive mandrel, which may be inserted into a tube, ring, or other hollow body and then expanded into contact with the interior side walls of the tube or other hollow body for supporting the same or for any other purpose.

My invention consists of a mandrel comprising a central support provided with ways extending radially therethrough and intercepting each other at or near the center thereof, jaws mounted in said ways, inclined slot and wedge connections interposed between the faces of said jaws and the side wall of said ways for expanding said jaws, and means for shifting said jaws; and my invention further consists of the improvements hereinafter described, and pointed out in the claims.

The nature and characteristic features of my present invention will be more fully understood from the following description, taken in connection with the accompanying drawings, forming part thereof, and in which—

Figure 1 is a side elevation, partly in section, of a mandrel embodying features of my invention, showing a central support provided with ways, jaws movable in said ways, slot and wedge connections for expanding said jaws, and means for shifting said jaws collectively or singly in said ways. Fig. 2 is a transverse section on the line 2 2 of Fig. 1, showing the movable jaws disposed in a circle having its center coincident with the center of the support. Figs. 3 and 4 are respectively side and end views showing a mandrel embodying features of my invention partially inserted into a tube, and also showing the movable jaws disposed eccentrically with relation to the center of the support. Fig. 5 is a side view, partly in section, of a mandrel embodying a modified arrangement of the slot and wedge connections and showing means for shifting the movable jaws collectively; and Fig. 6 is an end view, partly in section, of Fig. 5.

In the drawings, $a$ is a central support provided with ways $a^2$, extending radially therethrough and intercepting each other at the center thereof. These ways $a^2$ are formed by intercepting slots $a^3$, Fig. 2, extending transversely through but not to the ends of the support $a$, and by radially-projecting ribs $a'$, having their interior faces in line with the side walls of the slots. $b$ are a series of jaws mounted, respectively, in said ways and adapted to be shifted freely in the direction of the length of the support $a$.

Each of the jaws $b$ is connected with the ribs forming the ways in which it works by means of inclined slot and wedge connections. In Figs. 1, 2, 3, and 4 the inclined slots $c$ are cut or otherwise formed in the ways, and the inclined wedges $c'$ project from the respective side faces of the jaws $b$. In Figs. 5 and 6 the inclined slots $c^3$ are cut or otherwise formed in the jaws, and the wedges, which in this instance assume the shape of studs $c^4$, are connected at their respective extremities with the ribs $a'$. In either case, whenever the jaws $b$ are shifted either collectively or singly toward the left in the drawings, the inclined slot and wedge connections cause them to be shifted outward and away from the center of the support, Fig. 5, and whenever the jaws $b$ are shifted toward the right in the drawings the inclined slot and wedge connections cause them to be shifted inward and toward the center of the support $a$, as shown at the upper portion of Fig. 3.

$d$ is a nut, preferably provided with a polygonal head $d'$, and adapted to engage a thread $d^3$ cut or otherwise formed upon the support $a$.

$e$ is a collar rotatably mounted upon the shank $d^4$ of the nut $d$, and held against end-play thereon by means of a set-screw $e'$, working in a groove $e^2$, formed upon the shank $d^4$ of the nut $d$, so that the rotation of the nut $d$ causes the collar $e$ to be shifted in the direction of the length of the support $a$.

The jaws $b$ may be shifted collectively by attaching them to a circular plate $e^7$, connected with or attached to the collar $e$, as shown in Figs. 5 and 6. However, these jaws may be shifted collectively or singly, as required, by providing the collar $e$ with two plates $e^4$ and $e^5$, Fig. 1, and mounting nuts $f$ between said plates $e^4$ and $e^5$ upon the threaded shanks $b'$ of the jaws $b$, Figs. 1, 2, 3, and 4, so that the rotation of one of the nuts $f$ causes the corresponding jaw to be shifted.

The jaws $b$ are preferably provided with two or more working surfaces $b^2$ and $b^3$, in order to accommodate them to tubes or hollow bodies of different diameters, and may be arranged concentrically with relation to the central support, as shown in Figs. 1, 2, 5, and 6, or eccentrically with relation thereto, as shown in Figs. 3 and 4, according to the different uses for which the mandrel is designed. For example, the jaws are disposed concentrically with relation to the support $a$ when the mandrel is used for supporting pulleys or wheels in a lathe, and are disposed eccentrically with relation to the center of the support when the mandrel is used as a chuck for supporting blanks for eccentrics or cams in a lathe.

In use the mandrel is inserted into an annular cavity in the work—for example, in the manner indicated in Fig. 3, whereupon the jaws $b$ are expanded in the manner hereinabove explained, in order to cause them to grip the side walls of the cavity, whereupon the work may be mounted in a lathe or machine-tool in the usual manner.

Having thus described the nature and objects of my present invention, what I claim as new, and desire to secure by Letters Patent, is—

1. A mandrel comprising a central support provided with ways, jaws mounted in said ways, inclined slot and wedge connections interposed between each of the faces of said jaws and the side walls of said ways for expanding said jaws, and means, substantially as described, for shifting said jaws, for the purposes set forth.

2. A mandrel comprising a central support provided with radial ribs forming ways, jaws mounted in said ways, inclined slot and wedge connections interposed between the adjacent side walls of each of said jaws and ribs for expanding the jaws, and means, substantially as described, for shifting said jaws, for the purposes set forth.

3. A mandrel comprising a central support provided with ways extending radially therethrough and intercepting each other at the center thereof, jaws mounted in said ways, inclined slot and wedge connections interposed between each of the faces of the jaws and the adjacent side walls of the ways, a nut on said support, and a collar connected with said nut and jaws, substantially as and for the purposes set forth.

4. A mandrel comprising a central support provided with intercepting radial slots extending through but not to the ends thereof, radially-projecting ribs connected with said support and having their interior faces in alignment with the side walls of said slots to form ways, jaws mounted in said ways, inclined slot and wedge connections interposed between each of the faces of said jaws and the side walls of said ways for expanding said jaws, and means, substantially as described, for shifting said jaws, for the purposes set forth.

5. A mandrel comprising a threaded central support provided with ways, jaws mounted in said ways, inclined slot and wedge connections for expanding said jaws, a nut on said support, and a collar applied to said nut and adjustably connected with the shank of each of said jaws, substantially as and for the purposes set forth.

6. A mandrel comprising a threaded central support provided with ways, jaws mounted in said ways, inclined slot and wedge connections for expanding said jaws, a nut on said support, a flanged collar applied to said nut, and a series of nuts engaging said flanged collar and the respective shanks of said jaws, substantially as and for the purposes set forth.

7. A mandrel comprising a central support provided with ways, jaws mounted in said ways and disposed eccentrically with respect to said support, inclined slot and wedge connections for expanding said jaws, and means for shifting said jaws singly and collectively, substantially as and for the purposes set forth.

In witness whereof I have hereunto set my signature in the presence of two subscribing witnesses.

JOHN WALTER GRANTLAND.

Witnesses:
    THOMAS M. SMITH,
    RICHARD C. MAXWELL.